(12) United States Patent
Davies et al.

(10) Patent No.: US 11,621,737 B2
(45) Date of Patent: Apr. 4, 2023

(54) ARCHITECTURE FOR WIDEBAND RECEIVER MODULE WITH ACOUSTIC FILTER ARRAY

(71) Applicant: Rockwell Collins, Inc., Cedar Rapids, IA (US)

(72) Inventors: Orion Davies, Cedar Rapids, IA (US); Russell D. Wyse, Center Point, IA (US); Jonathan A. Lovseth, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 50 days.

(21) Appl. No.: 17/335,903

(22) Filed: Jun. 1, 2021

(65) Prior Publication Data
US 2022/0385321 A1     Dec. 1, 2022

(51) Int. Cl.
*H04B 1/10*     (2006.01)
*H04B 1/00*     (2006.01)

(52) U.S. Cl.
CPC ......... *H04B 1/1036* (2013.01); *H04B 1/0096* (2013.01); *H04B 2001/1063* (2013.01)

(58) Field of Classification Search
CPC .............. H04B 1/1036; H04B 1/0096; H04B 2001/1063
See application file for complete search history.

(56) References Cited

U.S. PATENT DOCUMENTS

| 3,983,517 | A | 9/1976 | Weglein | |
|---|---|---|---|---|
| 6,363,262 | B1 * | 3/2002 | McNicol | H04B 1/26 455/313 |
| 8,558,353 | B2 * | 10/2013 | Salzman | H01L 25/0657 257/621 |
| 10,951,246 | B2 * | 3/2021 | Lax | H04B 1/0057 |
| 2008/0088499 | A1 * | 4/2008 | Bonthron | G01S 13/931 342/104 |
| 2014/0169411 | A1 * | 6/2014 | Aunkofer | H04B 1/1036 375/148 |

FOREIGN PATENT DOCUMENTS

| CN | 105610453 A | 5/2016 |
|---|---|---|
| CN | 106911341 A | 6/2017 |
| CN | 104363432 B | 10/2017 |
| CN | 109407092 A | 3/2019 |
| CN | 110429952 A | 11/2019 |
| CN | 210609134 U | 5/2020 |
| CN | 111446975 A | 7/2020 |
| KR | 1020010039057 A | 5/2001 |
| KR | 100461720 B1 | 12/2004 |

* cited by examiner

*Primary Examiner* — David S Huang
(74) *Attorney, Agent, or Firm* — Suiter Swantz pc llo

(57) ABSTRACT

A system with an acoustic filter array for analog processing of radio signals above 8 GHz includes a receiver and a downconverter to down-convert an incoming signal into an intermediate frequency range (IF). Downconverter includes suppression of local oscillator image. An active manifold splits the IF signal into separate parallel feeds into individual acoustic filter elements in an acoustic filter array. Acoustic filter array provides individually channelized IF outputs. Each IF manifold feed and corresponding acoustic filter output channel is associated with an analog-to-digital converter or system switch.

19 Claims, 5 Drawing Sheets

ARCHITECTURE FOR WIDEBAND RECEIVER MODULE WITH ACOUSTIC FILTER ARRAY

BACKGROUND

Surface Acoustic Wave (SAW) and Bulk Acoustic Wave (BAW) filters provide many advantages when used as bandpass filters to physically channelize Radio Frequency (RF) bands. Thin-film bulk acoustic resonators (FBAR) achieve higher quality factor by removing some mechanical anchor points on the resonator. These micro-electro-mechanical systems devices are physically on the order of a square millimeter in size when packaged as individual components. The core circuitry for these components is even smaller. However, current materials limitations prevent further reduction in size to make such acoustic filters useful for higher frequency/shorter wavelength signals.

There is a need for chip-scale filters that operate from X-band through Ka-band (i.e. "millimeter-wave" frequencies) with high performance for efficient spectrum utilization and protection from jamming or other in-band interference. The limitations of operating frequency for existing BAW/SAW filters pose a significant challenge in such applications. Commercially available BAW filter components function well at frequencies at or below 8 GHz.

SUMMARY

In one aspect, embodiments of the inventive concepts disclosed herein are directed to system with an acoustic filter array for analog processing of signals above 8 GHz. The system includes an RF receiver with an image suppressing mixer that down-converts an incoming signal into an Intermediate Frequency (IF) range where acoustic resonators can function. An active splitting manifold separates the IF signal into separate channels, at a smaller physical scale than possible with a passive splitting manifold, and individual acoustic filter elements in an acoustic filter array are fed by individual IF manifold channels.

In a further aspect, each IF manifold channel and corresponding acoustic filter output is associated with an analog-to-digital converter (ADC).

In a further aspect, IF manifold channel(s) are associated to one or more switches for selective routing of an individual channel to an ADC.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
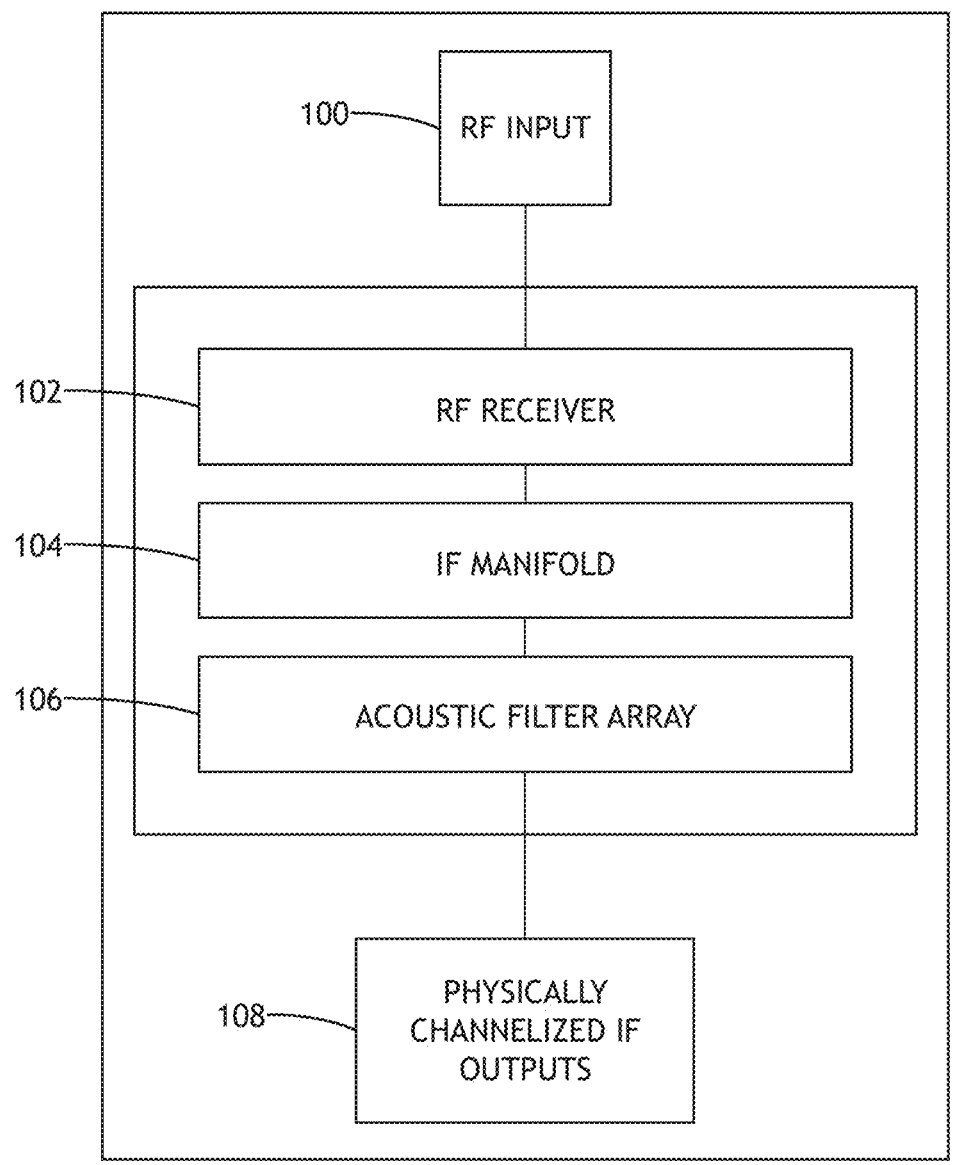
FIG. 1 shows a block diagram of a system suitable for implementing embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to system with an acoustic filter array for analog processing of signals above 8 GHz. The system includes an RF receiver with an image suppressing mixer that down-converts an incoming RF signal into an IF frequency range while rejecting the Local Oscillator (LO) image product from the RF input. An active manifold separates the IF signal into separate channels and individual acoustic filter elements in an acoustic filter array are fed by individual IF manifold channels. Each IF manifold channel and corresponding acoustic filter is associated with an analog-to-digital converter or a switch.

Referring to FIG. 1, a block diagram of a system suitable for implementing embodiments of the present disclosure is shown. An RF input 100, such as an antenna or antenna array, receives an RF signal. An RF receiver 102 receives the RF signal from the RF input 100 and down-converts the RF signal to IF bands while also increasing signal gain and suppressing the LO image. An active IF manifold 104 separates downconverted IF signal into separate channels at a physical scale smaller than possible with a passive splitting manifold. Each channel from the active IF manifold 104 feeds a corresponding acoustic filter in an acoustic filter array 106. Each acoustic filter in an acoustic filter array 106 produces a physically channelized IF output 108. In at least one embodiment, each physically channelized IF output 108 may correspond to a separate analog-to-digital converter, potentially including system specific analog-to-digital converters, and potentially including system specific switches.

The acoustic filters may comprise surface acoustic wave filters, bulk acoustic wave filters, thin-film bulk acoustic resonators, or other micro-electro-mechanical system resonator filters. Such filters require an air/vacuum cavity when packaged in order to support the physical motion of the resonator. By laminating an RF downconverter layer above the acoustic filter array 106, these cavities can support interconnects, while simultaneously protecting the acoustic filter array 106. Existing acoustic filters are affective in the IF bands but not RF bands; down-conversion facilitates the use of such filters at higher RF frequencies.

Figure 2:
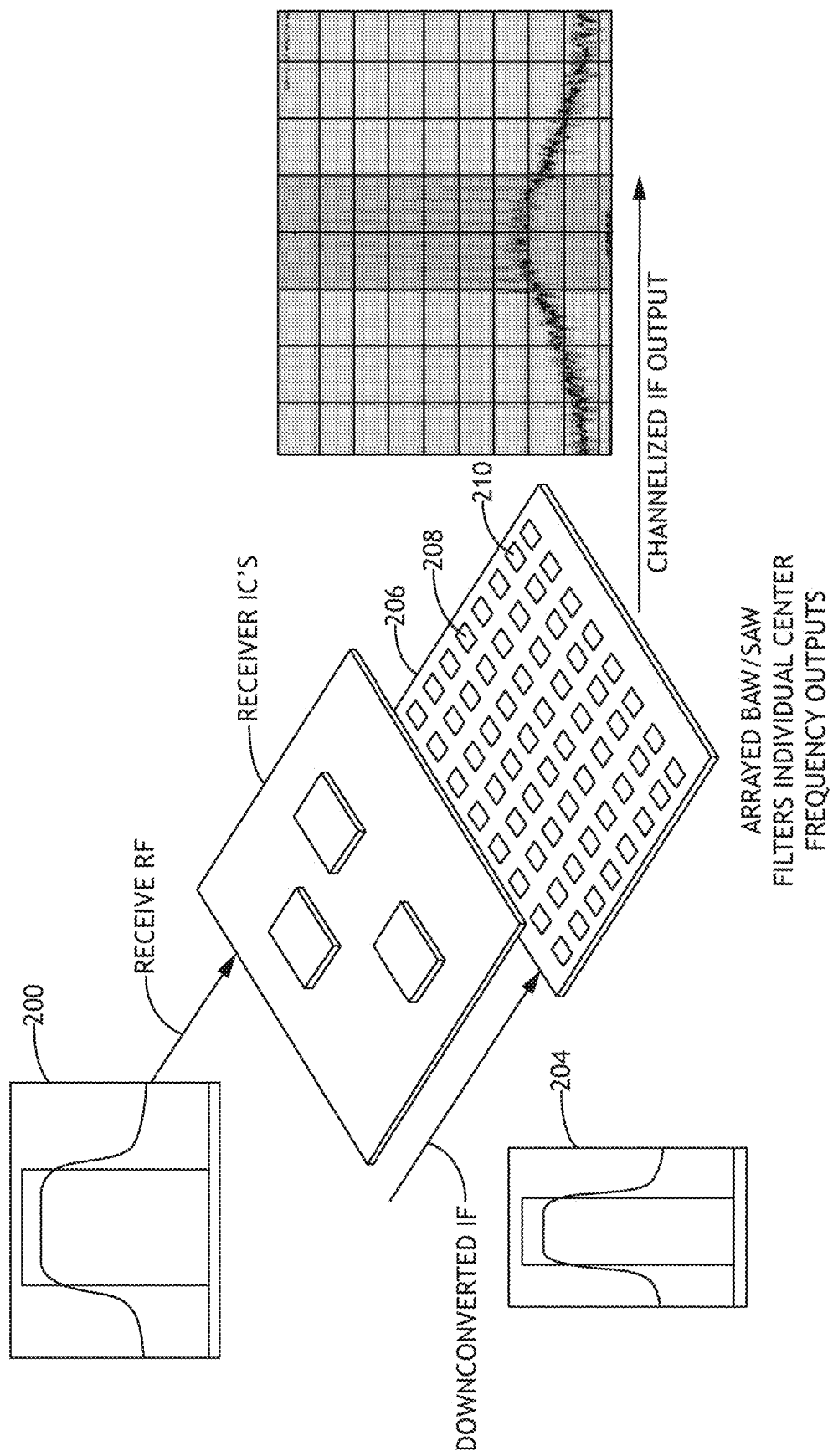
FIG. 2 shows a perspective block representation of a stacked receiver with image suppressing mixer, and filter array according to an exemplary embodiment.

Referring to FIG. 2, a perspective block representation of a stacked receiver integrated circuit 202 and filter array 206 according to an exemplary embodiment is shown. An RF signal 200 is received by an RF receiver and image suppressing mixer integrated circuit 202 that receives the RF signal 200 and down-converts the RF signal 200 into an IF signal 204. The IF signal 204 is split via an active IF manifold and each parallel output component from the splitter is fed into an individual acoustic filter 208, 210 in an acoustic filter array 206. The acoustic filter array 206 produces channelized IF outputs 212 which may be fed individually into analog-to-digital converters or switches.

Figure 3:
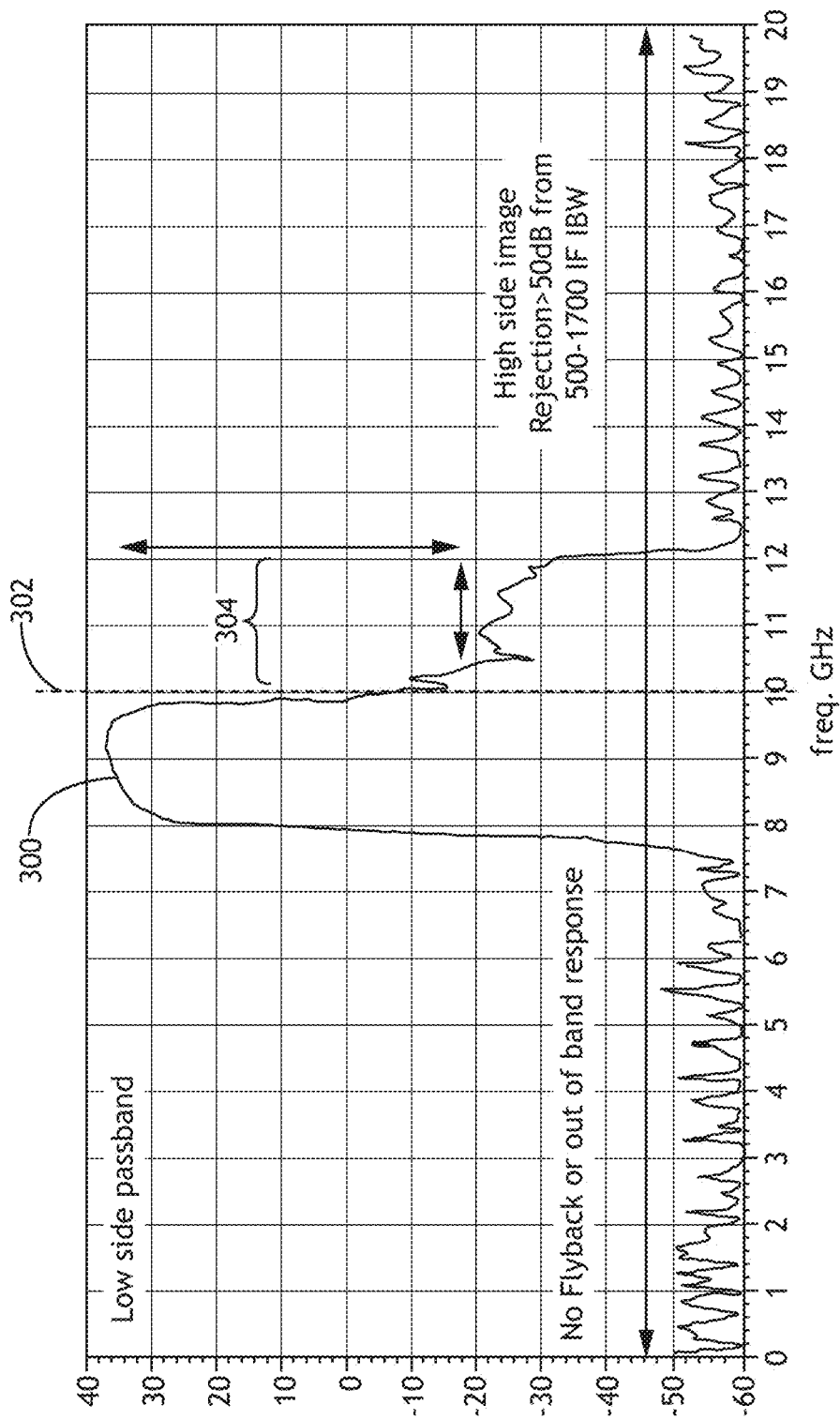
FIG. 3 shows a graph of an RF signal response that is downconverted to IF, and routed to a bandpass filter array.

Referring to FIG. 3, an exemplary graph of an RF signal response to a bandpass filter array is shown. A signal 300 between 8 GHz and 10 GHz is passed through a receiver/filter stack. An image suppressing receiver, with high side injection of the LO signal, image rejects 304 at a predefined threshold 302.

Figure 4:
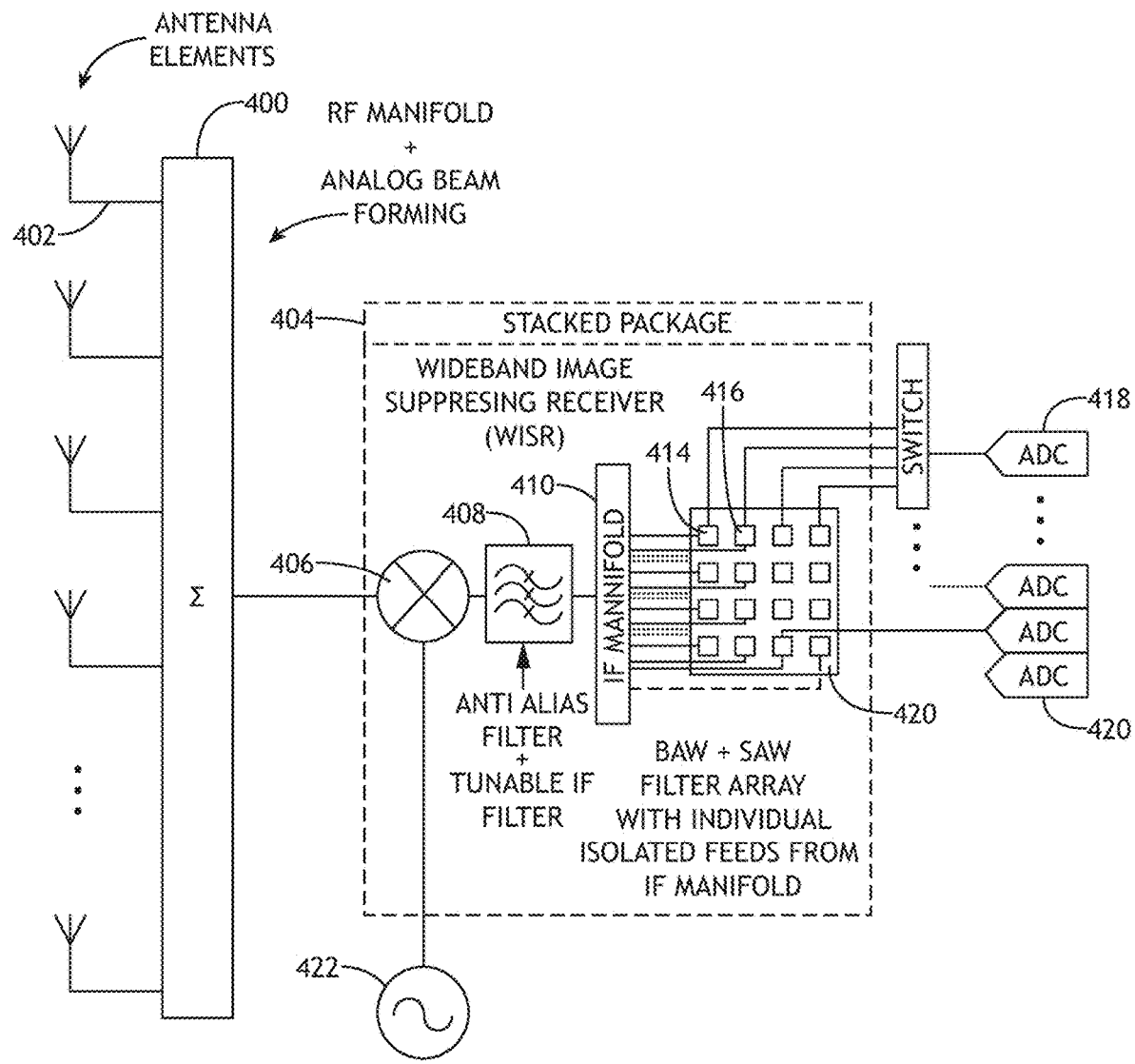
FIG. 4 shows a block diagram of a system according to an exemplary embodiment.

Referring to FIG. 4, a block diagram of a system according to an exemplary embodiment illustrating an electronically steered antenna with analog beam forming is shown. The system includes an RF manifold 400 in data communication with a plurality of antennas 402; a stacked receiver integrated circuit 404 receives the aggregate RF signal from the RF manifold 400. A wideband image suppressing receiver 406 receives and down-converts the RF signal to an IF signal while rejecting the image signal artifact created through the process of frequency conversion in a mixer. The wideband image suppressing receiver 406 may operate with reference to a local oscillator 422. The down-converted IF signal is then delivered to an active IF manifold 410 that separates the down-converted IF signal into parallel paths, each path being fed to a separate, dedicated acoustic filter 414, 416 in an acoustic filter array 412. The output of each dedicated acoustic filter 414, 416 in an acoustic filter array 412 is an individual signal channel. The active IF manifold 410 may comprise electromagnetically isolated feeds to the acoustic filter array 412; the electromagnetically isolated feeds comprising active signal splitting elements, passive Wilkinson splitting, or a combination thereof to balance loss, size, and power consumption.

In at least one embodiment, each acoustic filter 414, 416 drives a separate analog-to-digital converter 420. Alternatively, or in addition, a set of acoustic filters 414, 416 may feed a single analog-to-digital converter 420 via a switch 418.

In at least one embodiment, the stacked receiver integrated circuit 404 includes an anti-aliasing filter and a tunable notch filter 408 disposed between the wideband image suppressing receiver 406 and the active IF manifold 410.

Figure 5:
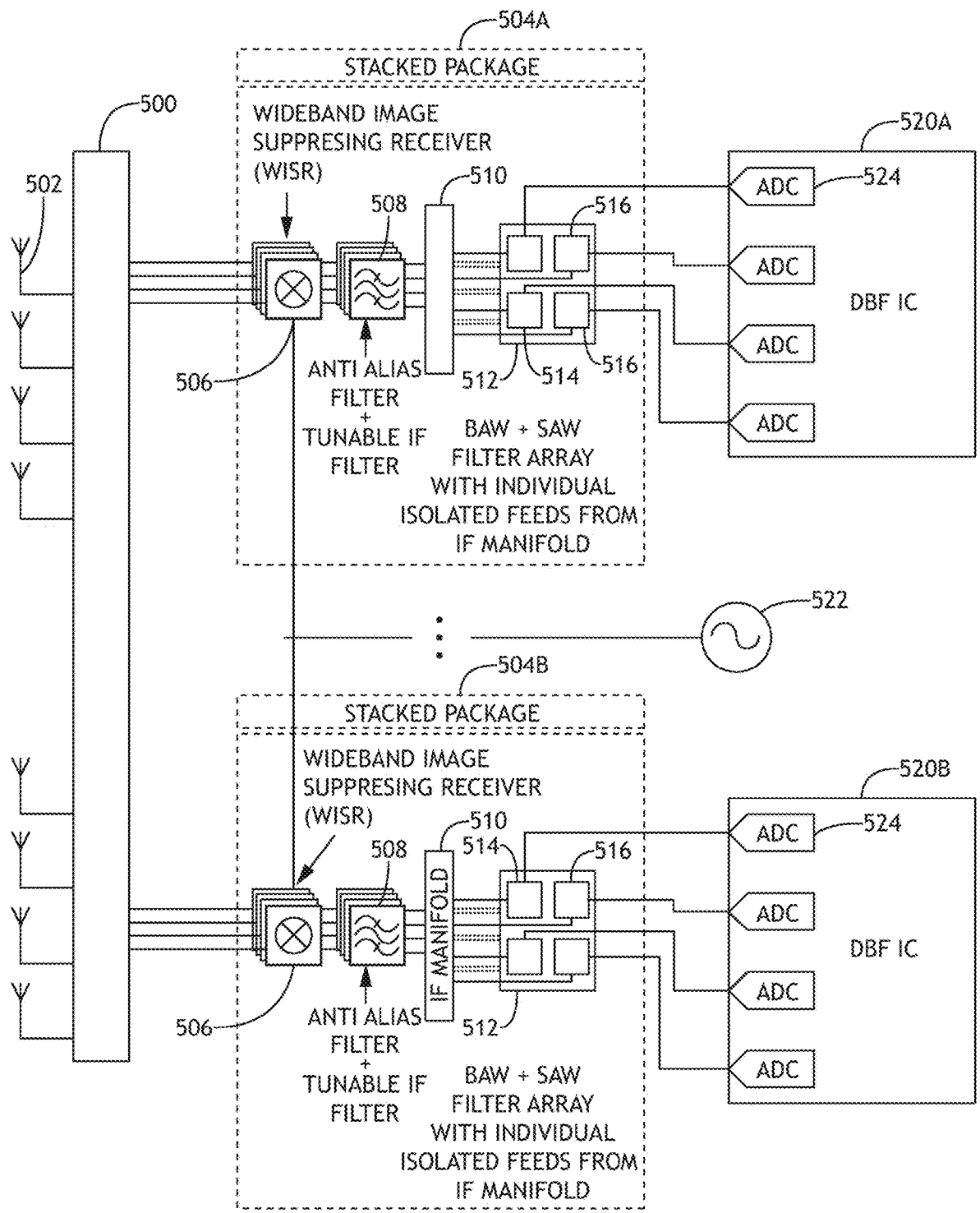
FIG. 5 shows a block diagram of a system according to an exemplary embodiment.

Referring to FIG. 5, a block diagram of a system according to an exemplary embodiment illustrating an electronically steered antenna with digital beam forming is shown. The system adapted for processing a digital signal includes an RF manifold 500 in data communication with a plurality of antennas 502. Stacked receiver integrated circuits 504A, 504B each receive RF signal from each antenna element on the RF manifold 500. Each RF signal is associated with a dedicated wideband image suppressing receiver 506 in the stacked receiver integrated circuit 504A, 504B that receives and down-converts the corresponding RF signal to an IF signal. Each wideband image suppressing receiver 506 may operate with reference to a local oscillator 522 common to all of the stacked receiver integrated circuits 504A, 504B. Each image suppressing receiver 506 may define a separate signal channel; in at least one embodiment, each stacked receiver integrated circuit 204A, 204B may define four digital channels to interface one stacked package with every four antenna elements.

Each down-converted IF signal is delivered to an active IF manifold 510 that directs the down-converted IF signal into channels, each channel being fed to a separate, dedicated acoustic filter 514, 516 in an acoustic filter array 512.

In at least one embodiment, each acoustic filter 514, 516 drives a separate analog-to-digital converter 524 in a corresponding digital beamforming integrated circuit 520A, 520B.

In at least one embodiment, each stacked receiver integrated circuit 504 includes a set of anti-aliasing filter and tunable notch filter 508 disposed between the corresponding wideband image suppressing receiver 406 and the active IF manifold 410.

Embodiments of the present disclosure enable RF integrated circuit design topologies for millimeter wave image suppressing receivers, and processes for designing and fabricating a compact and electromagnetically isolated intermediate frequency manifold that feeds into an array of acoustic filter components to physically channelize the down-converted RF spectrum.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An integrated circuit comprising:
a radio frequency receiver;
a downconverter configured to receive radio frequency signals from the radio frequency receiver and down-convert the radio frequency signals to an intermediated frequency band and suppress a local oscillator image;
an intermediate frequency band manifold configured to separate the down-converted radio frequency signals into separate channels and feed each channel to a separate acoustic filter in an acoustic filter array; and
an acoustic filter array comprising a plurality of acoustic filters, each configured to operate on an intermediate frequency band signal,
wherein each acoustic filter is configured for a distinct bandpass output, and the downconverter is disposed above the acoustic filter array in a laminated stack to protect an air/vacuum space of the acoustic filters.

2. The integrated circuit of claim 1, further comprising a plurality of analog-to-digital converters, each analog to digital converter associated with a specific channel and acoustic filter.

3. The integrated circuit of claim 1, further comprising:
at least one analog-to-digital converter; and
a switch in data communication with the array of acoustic filters and the at least one analog-to-digital converter.

4. The integrated circuit of claim 1, further comprising at least one anti-aliasing filter in data communication with the radio frequency receiver and the intermediate frequency band manifold.

5. The integrated circuit of claim 1, further comprising at least one anti-aliasing filter and at least one tunable notch filter in data communication with the radio frequency receiver and the intermediate frequency band manifold.

6. The integrated circuit of claim 1, wherein the intermediate frequency band manifold comprises electromagnetically isolated feeds to the acoustic filter array.

7. The integrated circuit of claim 6, wherein the intermediate frequency band manifold further comprises a plurality of active signal splitting elements.

8. The integrated circuit of claim 6, wherein the intermediate frequency band manifold further comprises a plurality of passive Wilkinson splitting elements.

9. A method comprising:
receiving a radio frequency signal;
downconverting the radio frequency signal to an intermediate frequency signal via an RF downconverter;
suppressing a local oscillator image;
splitting the intermediate frequency signal into parallel feeds; and
filtering each parallel feed into an individual channel with a separate intermediate frequency band acoustic filter in an acoustic filter array,
wherein the RF downconverter is disposed above the acoustic filter array in a laminated stack to protect an air/vacuum space of the acoustic filters.

10. The method of claim 9, further comprising filtering the down-converted intermediate frequency signal via an anti-aliasing filter and tunable intermediate frequency notch filter before splitting and channelizing.

11. The method of claim 9, wherein splitting the intermediate frequency signal into separate parallel feeds utilizes an intermediate frequency band manifold comprising electromagnetically isolated feeds to the acoustic filter array.

12. The method of claim 9, further comprising increasing a signal gain during down-conversion.

13. A system comprising:
at least one integrated circuit comprising:
at least one image suppressing radio frequency receiver and downconverter configured to receive radio frequency signals and down-convert the radio frequency signals to an intermediated frequency band and suppress a local oscillator image;
an intermediate frequency band manifold configured to split the down-converted radio frequency signals into separate parallel feeds, each routed to a separate acoustic filter in an acoustic filter array; and
an acoustic filter array comprising a plurality of acoustic filters, each configured to operate on an intermediate frequency band signal and provide channelized intermediate frequency outputs,
wherein the at least one image suppressing radio frequency receiver and downconverter, intermediate frequency band manifold, and acoustic filter array are disposed in a laminated stack with the downconverter above the acoustic filter array to protect an air/vacuum space of the acoustic filters.

14. The system of claim 13, wherein the at least one integrated circuit comprises at least two integrated circuits, each having a plurality of image suppressing radio frequency receiver and downconverters, each corresponding to a separate digital channel.

15. The system of claim 14, further comprising a plurality of analog-to-digital converters, each analog to digital converter associated with a specific digital channel.

16. The system of claim 14, wherein each integrated circuit further comprises at least one anti-aliasing filter in data communication with each image suppressing radio frequency receiver and downconverter and the intermediate frequency band manifold.

17. The system of claim 16, wherein each integrated circuit further comprises at least one tunable intermediate frequency notch filter in data communication with each image suppressing radio frequency receiver and downconverter and the intermediate frequency band manifold.

18. The system of claim 13, wherein the intermediate frequency band manifold comprises electromagnetically isolated feeds to the acoustic filter array.

19. The system of claim 18, wherein the intermediate frequency band manifold further comprises a plurality of active signal splitting elements or Wilkinson splitting elements.

* * * * *